United States Patent
Emery

(10) Patent No.: US 6,498,415 B1
(45) Date of Patent: Dec. 24, 2002

(54) HIGH VOLTAGE STATOR COIL HAVING LOW LOSS INSULATOR AND ELECTRODE COVERING AND METHOD THEREFOR

(75) Inventor: Franklin T. Emery, Ft. Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/655,584

(22) Filed: Sep. 6, 2000

(51) Int. Cl.⁷ .................................................. H02K 3/40
(52) U.S. Cl. ...................... 310/196; 310/195; 310/215; 174/120 R
(58) Field of Search ................................. 310/195, 196, 310/213, 215; 174/120 R, 127

(56) References Cited

U.S. PATENT DOCUMENTS

| | | |
|---|---|---|
| 1,418,856 A | 6/1922 | Williamson |
| 2,165,738 A | 7/1939 | Van Hoffen .................. 201/76 |
| 2,399,314 A | 4/1946 | Barker et al. ................ 174/102 |
| 2,705,292 A * | 3/1955 | Wagenseil .................... 310/196 |
| 2,789,154 A | 4/1957 | Peterson ....................... 174/73 |
| 3,049,584 A | 8/1962 | D'Ascoli ...................... 174/120 |
| 3,254,150 A | 5/1966 | Rogers, Jr. .................... 174/17 |
| 3,312,774 A * | 4/1967 | Peterson ....................... 174/120 |
| 3,670,192 A * | 6/1972 | Andersson et al. .......... 310/196 |
| 4,001,616 A * | 1/1977 | Lonseth et al. ................ 310/45 |
| 4,318,020 A | 3/1982 | Meyer .......................... 310/215 |
| 4,425,519 A | 1/1984 | Balke et al. ................... 310/45 |
| 5,030,870 A | 7/1991 | Wichmann ................... 310/215 |
| 5,175,396 A | 12/1992 | Emery et al. .................. 174/36 |
| 5,574,325 A | 11/1996 | von Musil et al. ........... 310/215 |
| 6,043,582 A | 3/2000 | Markovitz et al. ........... 310/213 |

* cited by examiner

*Primary Examiner*—Burton S. Mullins

(57) ABSTRACT

A high voltage stator bar 20 (FIG. 7) is used in a power generation system and includes a core section having a core 32 and stator coil 23, including at least one coil involute. A ground wall insulation layer 40 overlies and surrounds the stator coil. An inner grounding electrode 42 overlies and surrounds at least a portion of the ground wall insulation layer and includes the at least one coil involute. An insulator 46 overlies and surrounds the inner grounding electrode and leaves at least one exposed area 51 of the inner grounding electrode. An outer grounding electrode 52 overlies and surrounds the insulator and is electrically connected to the inner grounding electrode at the at least one exposed area of the inner grounding electrode for relieving a build-up of internal voltage, thereby preventing partial discharge.

14 Claims, 5 Drawing Sheets

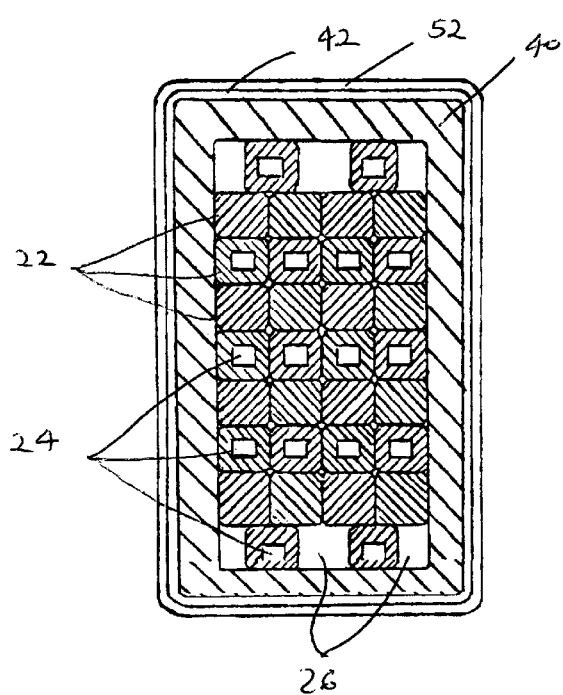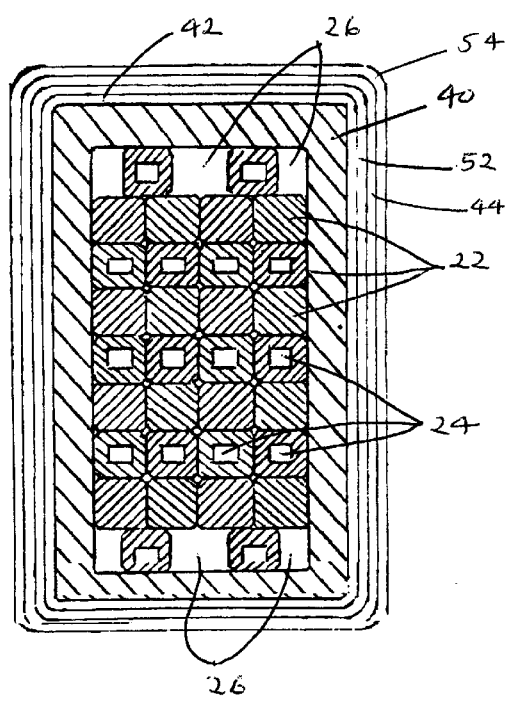

HIGH VOLTAGE STATOR COIL HAVING LOW LOSS INSULATOR AND ELECTRODE COVERING AND METHOD THEREFOR

FIELD OF THE INVENTION

This invention relates to high voltage components, such as a high voltage stator coil, and more particularly, to a high voltage component having a covering for relieving the build-up of internal voltage, thereby preventing partial discharge.

BACKGROUND OF THE INVENTION

Many high voltage components, such as a stator coil, use an outer conductive ground electrode to ensure that the outer surface is at ground potential. In some of these applications, the ground electrode extends several inches beyond the end of the typically iron stator core into the coil's end turn region, i.e., the involute region. On high voltage stator bars that have the ground plane extended into the coil involute region, in the region where the ground plane extends beyond the stator core, partial discharge may occur because the involute ground plane may be exposed to physical damage, including mechanical rubs, abrasive particles, surface contamination, and higher than normal voltage stress and temperatures. The end of the core is also a region where mechanical rubs could cause the coil surface to make and break ground contact with the core. With any mechanical rub from the core edge, a support block or a band rub causes localized damage in the surface of the outer ground electrode. When a make and break contact occurs with the outer surface ground electrode and core, current interruption will occur and cause localized partial discharges. When these partial discharges are allowed to occur, surface discharge erosion can occur in the coil's outer ground electrode. If the erosion in the outer ground electrode is allowed to progress, extensive failure of the involute outer ground electrode may occur. If partial discharge activity is allowed to continue over time, it is possible for complete coil ground wall failure to occur in this region.

Some prior art teachings have provided an improved wall structure for insulating an exterior surface of a high voltage component, such as a stator coil. Although the structures provide some mechanical support and covering, many prior art solutions have not provided protection for partial discharge activity, and only minimal protection for physical damage, including mechanical rubs, abrasive particles, surface contaminations, and higher than normal voltage stress and temperatures. Many prior art techniques have not provided adequate protection for the end of the core and coil, which is a region where mechanical rubs can cause the coil surface to make and break ground contact with the core.

One prior art technique is disclosed in U.S. Pat. No. 5,175,396 to Emery, et al. the disclosure which is hereby incorporated by reference in its entirety. In Emery et al., an improved wall structure insulates the exterior surface of a high voltage component, such as a high voltage coil having roebeled windings. An inner layer is formed from an insulating material disposed over the surface of the component. An outer ground wall grounds the wall structure. A layer of semiconductive material reduces the electric stress across the inner insulating layer and is preferably disposed between the outer surface of the inner insulating layer and the inner surface of the ground wall. A connection can be provided between the high voltage component and the layer of semiconductive material to further lower the electric stress over the inner insulating layer.

In U.S. Pat. No. 6,043,582 to Markovitz et al., a high voltage armature bar has one or more tiers, i.e., columns of conductor strands. Strand insulation surrounds each of the conductor strands. A conductive internal grading is positioned on and surrounds the tier of conductor strands. A ground wall insulation surrounds the conductive internal grading. A conductive material surrounds the ground wall insulation. A transposition filler can be formed by a molding compound at the opposite ends of the copper strand tiers. This molding compound could be formed of a conductive material.

Although these prior art teachings provide some insulator benefit and protection, it is desirable to provide greater protection for high voltage stator bars and the like.

SUMMARY OF THE INVENTION

The present invention is advantageous and provides a structure and method to prevent partial discharge in the conductive electrode and coil involute regions of high voltage air cooled stator coils.

In accordance with one aspect of the present invention, a high voltage component is formed as a stator coil, and includes a conducting coil and a ground wall insulation layer overlying and surrounding the conducting coil. An inner grounding electrode overlies and surrounds at least a portion of the ground wall insulation layer. An insulator overlies and surrounds at least a portion of the inner grounding electrode. An outer grounding electrode overlies and surrounds at least a portion of the insulator and is electrically connected to the inner grounding electrode in at least one location for relieving a build-up of internal voltage, thereby preventing partial discharge.

In still another aspect of the present invention, a high voltage stator used in power generation systems includes a core section having a core and at least one stator coil, including at least one coil involute. A ground wall insulation layer overlies and surrounds the at least one stator coil. An inner grounding electrode overlies and surrounds at least a portion of the ground wall insulation layer, including the at least one coil involute. An insulator overlies and surrounds the inner grounding electrode and leaves at least one exposed area of the inner grounding electrode. An outer grounding electrode overlies and surrounds the insulator and is electrically connected to the inner grounding electrode at the at least one exposed area of the inner grounding electrode for relieving a build-up of internal voltage, thereby preventing partial discharge.

The inner grounding electrode is formed from a conductive tape. The core has a core end and the conductive tape forming the inner grounding electrode has a start point that is in board from the core end. The coil involute includes an outboard end and a voltage grading tape is positioned on the outboard end and has a start point. The conductive tape forming the inner grounding electrode is applied beyond the start point of the voltage grading tape. The insulator forming the insulating tape covers the conductive tape forming the inner grounding electrode and leaves the exposed ends of the conductive tape forming the inner grounding electrodes. The outer grounding electrode can include a conductive tape that contacts the exposed ends of the conductive tape forming the inner grounding electrode. This conductive tape forms the inner grounding electrode and has a resistance of about 400 to about 1,000 ohms/square. The insulator comprises an insulating tape and can be a glass binder tape.

In still another aspect of the present invention, a method prevents partial discharge in a high voltage stator coil used in a power generation system. This method includes the steps of surrounding a high voltage stator coil with a ground wall insulation and applying an inner conductive electrode over the ground wall insulation. An insulator is applied over the inner conductive electrode. An outer conductive electrode is applied over the insulator while contacting the inner conductive electrode with the outer conductive electrode, thereby decreasing potential and preventing partial discharge. The inner conductive electrode, insulator and outer conductive electrode can be formed from a tape material.

BRIEF DESCRIPTION OF THE DRAWINGS

Other objects, features and advantages of the present invention will become apparent from the detailed description of the invention which follows, when considered in light of the accompanying drawings in which:

FIGS. 6–9 are sectional views taken along lines 6—6, 7—7, 8—8 and 9—9 respectively of FIG. 5.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
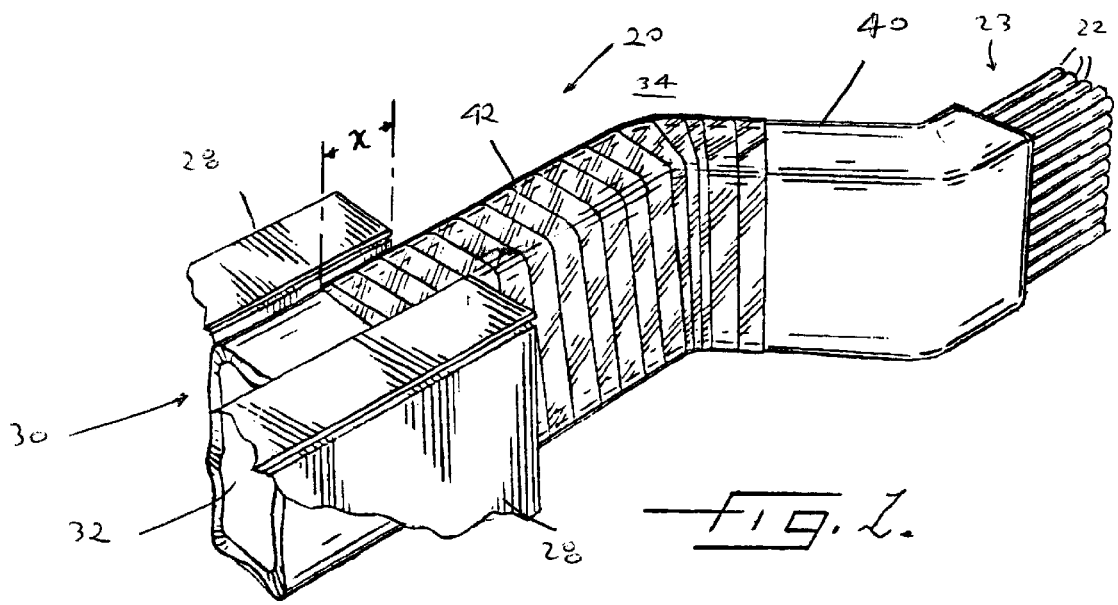
FIG. 1 is a perspective view of a high voltage stator formed form a plurality of coil strands and showing a ground wall insulation layer and the conductive tape forming the inner grounding electrode with the distance from the end of the core material as a dimension "X".

The present invention is advantageous and prevents partial discharge activity in a coil involute of a high voltage stator bar and similar high voltage component. It uses an outer conductive ground electrode to ensure that the outer surface of a high voltage coil is at ground potential. FIG. 1 illustrates a high voltage stator bar 20 that is formed from a plurality of high voltage coil strand elements 22 forming a stator coil 23. The coil strand elements are substantially rectangular configured, and in one aspect of the present invention as illustrated, are square configured and arranged in a rectangular configuration as shown in the sectional views of FIGS. 6–9. The coil strand elements are typically formed from copper as is known. Some of the coil strand elements include air cooling channels 24 for air cooling the stator bar. Also, two coil strand elements are positioned on top and bottom portions of the rectangular grouping of coil strand elements to form peripheral air channels 26 between coil strand elements where air cooling can occur.

Although the illustrated embodiment only shows one type of coil strand element configuration, it should be understood that the present invention is not limited to the illustrated stator bar, but can be used for different type of high voltage components, as known to those skilled in the art. The high voltage stator bar 20 is mounted by stator supports 28, which could be laminations or other supports, as known to those skilled in the art.

As shown in the figures, the high voltage stator bar 20 includes a core section 30 having a core 32 that is typically formed from iron. The stator coil 23 has at least one coil involute 34 and typically two, as known to those skilled in the art. The core 32 has a core end positioned generally at the portion indicated by the reference numeral 36. A ground wall insulation layer 40 is formed as a ground wall insulation tape and overlies and surrounds the stator coil 23. The ground wall insulation can be formed from other materials besides the illustrated tape, as known to those skilled in the art, and provides the insulator necessary to the stator coil.

An inner grounding electrode 42 overlies and surrounds at least a portion of the ground wall insulation layer 40, including the coil involutes 34 as illustrated. This inner grounding electrode 42 is preferably formed from a conductive tape and has a start point that is in board from the core end 36. It is applied to both coil involutes 34. The conductive tape in one aspect of the present invention has a resistance of about 400 to about 1,000 ohms/square. A single half lap layer of conductive tape is applied at a starting point that is four inches in board from the end of the core location along the illustrated coil straight portion.

Figure 3:
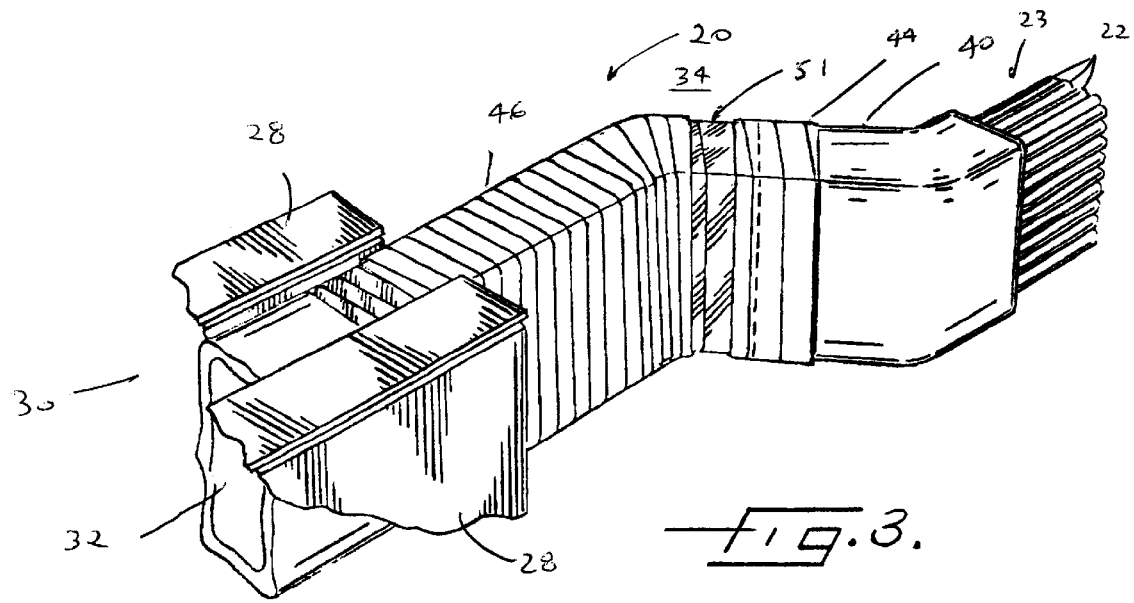
FIG. 3 is another perspective view similar to FIGS. 1 and 2 and showing a voltage grading tape.

A half lap layer of the conductive tape forming the inner grounding electrode is applied from the start point also to one inch beyond the start point of a voltage grading tape 44 that is later positioned on the out board end of the coil involute (FIG. 3). The length of the inner grounding electrode, i.e., conductive electrode, is equal to the total length of the coil involute that starts at four inches inboard from the core 32 and extends to one inch beyond the start of the voltage grading tape. These measurements can vary depending on the design and configuration of the high voltage stator or other high voltage components that are used in the industry, and only give an example of dimensions for the described embodiment. These dimension are non-limiting and vary depending on the requirements of those skilled in the art.

Figure 2:
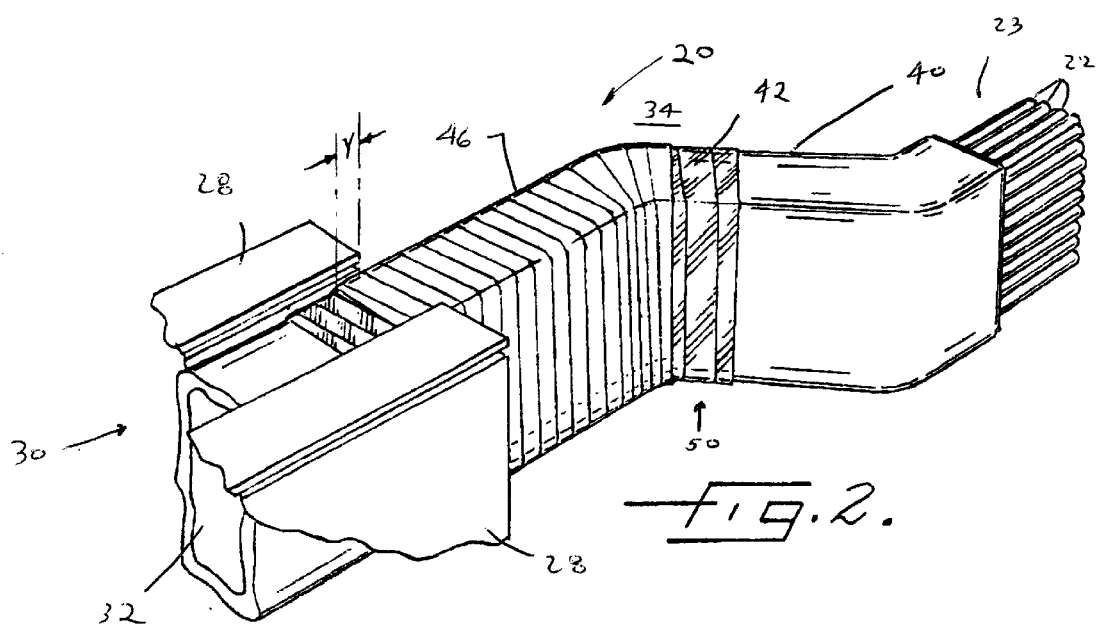
FIG. 2 is a perspective view similar to FIG. 1, and showing an insulating tape forming an insulator that covers the conductive tape a distance "Y" at the end of the core.

As shown in FIG. 2, an insulator 46 is applied to overlie and surround the inner grounding electrode 42. It is formed in one aspect of the present invention as a half lap layer of resin rich glass binder tape, and is applied starting at one inch inboard from the end of the core 32 as shown by the dimension "Y" and extends to two inches from where the voltage grading tape 44 (electrode) will begin. FIGS. 1 and 2 show the basic location of the voltage grading tape. An arrow indicated by reference numeral 50 indicates the start of the voltage grading tape as shown in FIG. 3. The insulator, i.e., glass binder tape, extends to two inches from the start of the voltage grading tape 50. As a result, about 2–3 inches on each end of the inner grounding electrode 42 is exposed after application of the insulator, i.e., glass binder tape, to form exposed areas 51. In one aspect of the present invention, a glass binder tape is used, and other insulator materials could be used as known to those skilled in the art.

Figure 4:
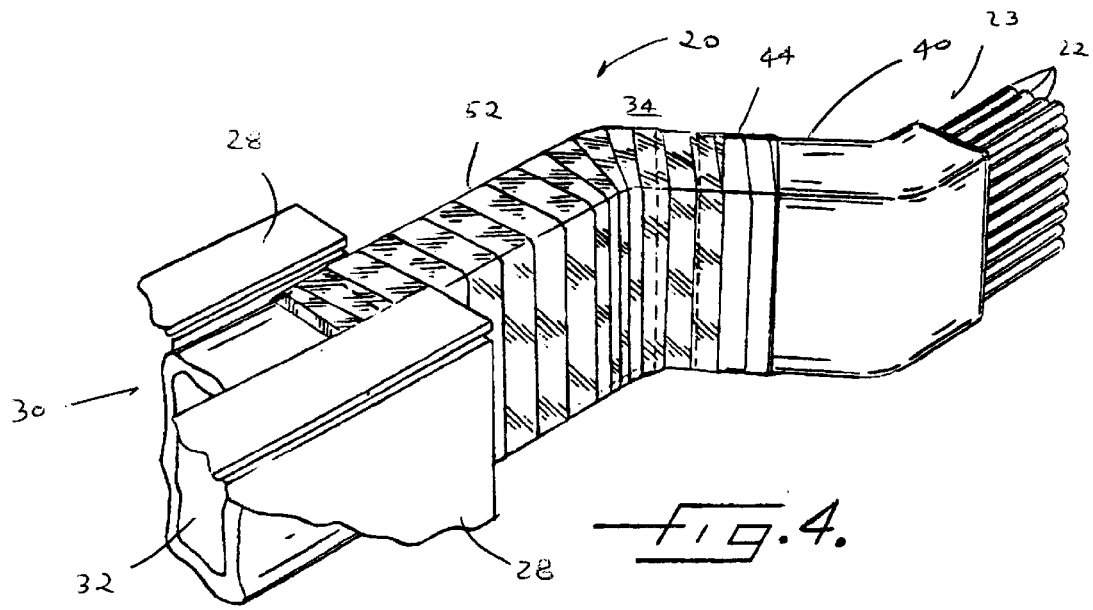
FIG. 4 is a perspective view similar to FIGS. 1–3 and showing a conductive tape forming an outer grounding electrode applied over the insulator and making contact at the ends to the inner grounding electrode.

As shown in FIG. 4, an outer grounding electrode 52 is formed as a conductive tape and overlies and surrounds the insulator 46 and electrically connects to the inner grounding electrode 42 at the two exposed areas 51 at the end for relieving a build-up of internal voltage, thereby preventing partial discharge. In one aspect of the present invention, a single half lap layer of conductive tape is applied the full outer ground electrode length on the coil and is per the normal design length. This outer grounding electrode 52 makes electrical contact with the inner grounding electrode 42 at each exposed area 51 of the inner grounding electrode.

Additionally, the outer grounding electrode 52 that is wrapped as a conductive tape and the insulator 46 that is wrapped as a resin rich binder tape forms a protective envelope for the inner grounding electrode 42. A resin rich glass binder tape 54 can also be applied over the outer grounding electrode such as on the other forming an involute ground electrode that cured during the coil curing process. Because most of the electrode system is in a coil involute, coil insulation build size is not a major problem and the coil can be processed as normal by techniques known to those skilled in the art.

Figure 5:
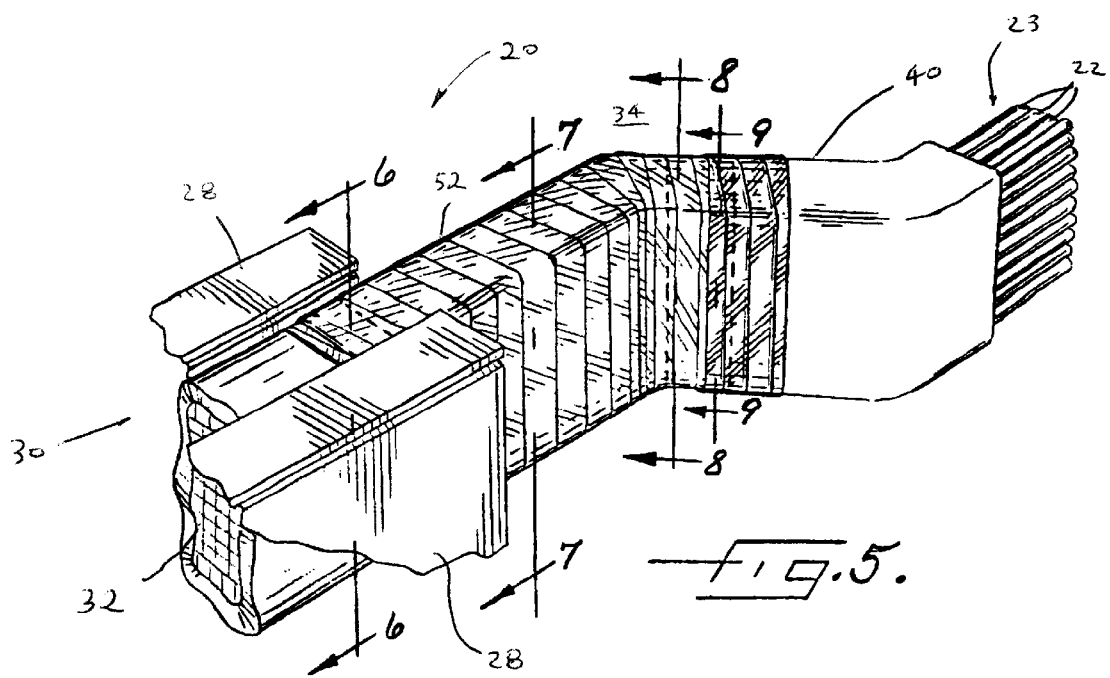
FIG. 5 is another perspective view similar to FIG. 4 showing sectional lines.
Figures 6, 7:
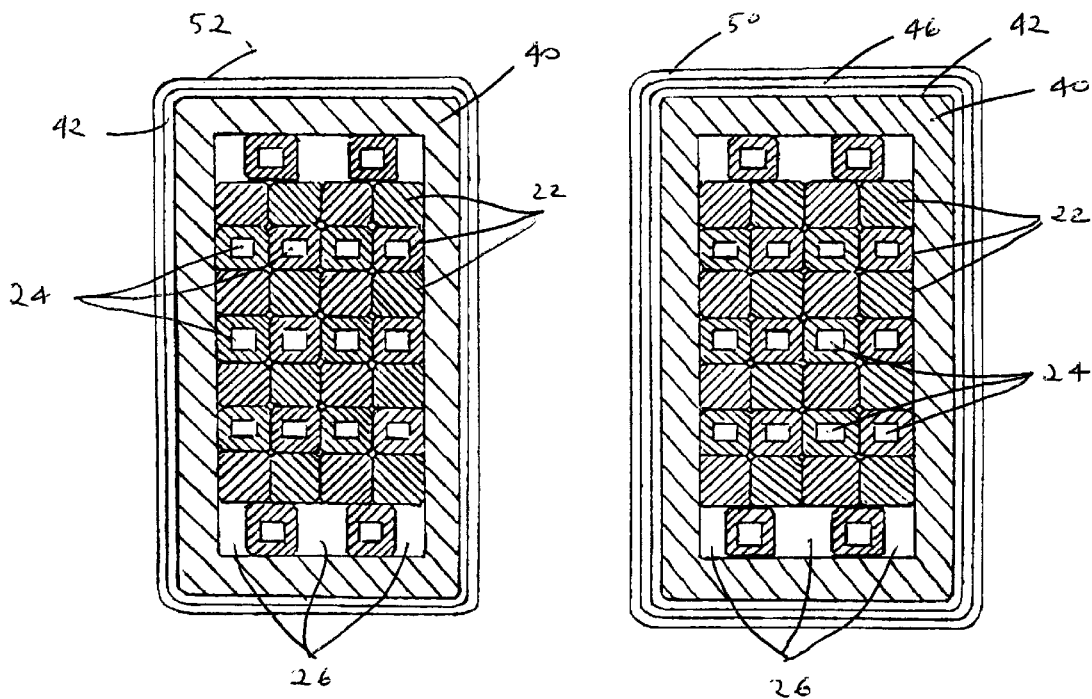

The sectional views of FIGS. 6–9 are taken along sectional lines 6—6, 7—7, 8—8 and 9—9 of FIG. 5 and show locations relative to the stator bar 20, the stator coil formed from individual coil strand elements, the ground wall insulation layer 40, inner grounding electrode 42, insulator layer 46, outer grounding electrode 52, and glass binder tape on the outer surface 54.

Figure 10:
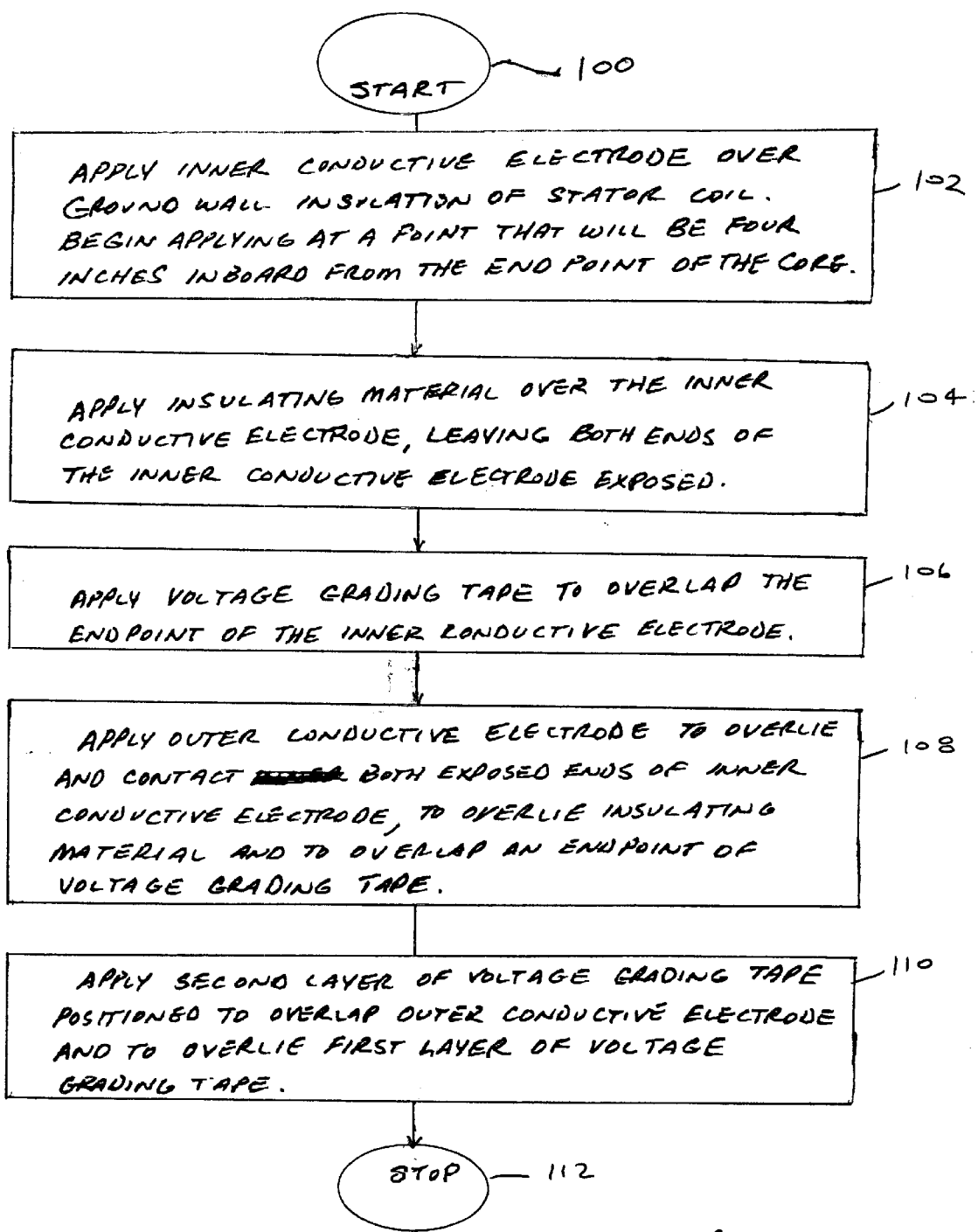
FIG. 10 is a flow chart illustrating the basic steps of forming the covering of the high voltage stator used in a power generation system of the present invention and preventing,partial discharge.

FIG. 10 is a flow chart showing the basic formation of the high voltage stator bar of the present invention that uses the insulator and grounding of the present invention. At the start (block 100) of the process, the inner conductive (grounding) electrode is applied over the ground wall insulation 40 of the stator coil (block 102). This is applied at a point that will be four inches inboard from the end point of the core 32. The insulator material 46 is applied over the inner conductive electrode 40, leaving both ends of the inner conductive electrode exposed (block 104). A voltage grading tape 44 is applied to overlap the end point of the inner conductive electrode (block 106). An outer conductive (grounding) electrode 52 is applied to overlie and contact both exposed areas 51 or ends of the inner conductive (grounding) electrode and overlie the insulating material and overlap an end point of the voltage grading tape 44 (block 108). A second layer of voltage grading tape 54 can be positioned to overlap the outer conductive electrode and overlie the first layer of voltage grading tape (block 110).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A high voltage component comprising:
   a conducting coil;
   a ground wall insulation layer overlying and surrounding said conducting coil;
   an inner grounding electrode overlying and surrounding at least a portion of the ground wall insulation layer;
   an insulation overlying and surrounding at least a portion of the inner grounding electrode; and
   an outer grounding electrode overlying and surrounding at least a portion of the insulator and electrically connected to said inner grounding electrode in at least one location for relieving a build up of internal voltage, thereby preventing partial discharge;
   wherein said insulator overlying and surrounding a portion of the inner grounding electrode comprises an insulating tape that comprises glass binder tape.

2. A high voltage component according to claim 1, wherein said inner grounding electrode comprises a conductive tape.

3. A high voltage component according to claim 1, wherein said conductive tape forming the inner grounding electrode has a resistance of about 400 to about 1,000 ohms/square.

4. A high voltage component according to claim 1, wherein the outer grounding electrode comprises a conductive tape.

5. A high voltage stator used in a power generation system comprising:
   a core section having a core and at least one stator coil, including at least one coil involute;
   a ground wall insulation layer overlying and surrounding said at least one stator coil;
   an inner grounding electrode overlying and surrounding at least a portion of the ground wall insulation layer, including the at least one coil involute;
   an insulator overlying and surrounding the inner grounding electrode and leaving at least one exposed area of the inner grounding electrode; and
   an outer grounding electrode overlying and surrounding the insulator and electrically connected to said inner grounding electrode at the at least one exposed area of the inner grounding electrode for relieving a buildup of internal voltage, thereby preventing partial discharge;
   wherein said inner grounding electrode comprises a conductive tape;
   wherein said core has a core end and wherein said conductive tape forming said inner grounding electrode has a start point that is inboard from the core end; and
   wherein said coil involute includes an outboard end and a voltage grading tape on the outboard end having a starting point, wherein said conductive tape forming said inner grounding electrode is applied beyond the start point of the voltage grading tape.

6. A high voltage stator according to claim 5, wherein said insulator comprises an insulating tape that covers said conductive tape forming said inner grounding electrode and leaving the exposed ends of the conductive tape forming the inner grounding electrode.

7. A high voltage stator according to claim 6, wherein said outer grounding electrode comprises a conductive tape that contacts the exposed ends of the conductive tape forming the inner grounding electrode.

8. A high voltage stator according to claim 5, wherein said conductive tape forming the inner grounding electrode has a resistance of about 400 to about 1,000 ohms/square.

9. A high voltage stator used in a power generation system comprising:
   a core section having a core and at least one stator coil, including at least one coil involute;
   a ground wall insulation layer overlying and surrounding said at least one stator coil;
   an inner grounding electrode overlying and surrounding at least a portion of the ground wall insulation layer, including the at least one coil involute;
   an insulator overlying and surrounding the inner grounding electrode and leaving at least one exposed area of the inner grounding electrode; and an outer grounding electrode overlying and surrounding the insulator and electrically connected to said inner grounding electrode at the at least one exposed area of the inner grounding electrode for relieving a buildup of internal voltage, thereby preventing partial discharge;

wherein said insulator comprises an insulating tape that comprises glass binder tape.

10. A high voltage stator according to claim 9, wherein the outer grounding electrode comprises a conductive tape.

11. A method of preventing partial discharge in a high voltage stator coil having an involute region, comprising the steps of:

surrounding a high voltage stator coil with a ground wall insulation;

applying an inner conductive electrode over the ground wall insulation such that the inner conductive electrode extends to a first position in the involute region of the stator coil;

applying an insulator over the inner conductive electrode such that the insulator extend to a second position in the involute region of the stator coil, the second position being inboard from the first position of the inner conductive electrode; and applying an outer conductive electrode over the insulator such that the outer conductive electrode extends beyond the second position of the insulator to be in electrical contact with the inner conductive electrode, thereby preventing partial discharge.

12. A method according to claim 11, and further comprising the step of applying the inner conductive electrode as a conductive tape.

13. A method according to claim 11, wherein the conductive tape has a resistance of about 400 to about 1,000 ohms/square.

14. A method according to claim 11, and further comprising the step of applying the insulator as a glass binder tape.

* * * * *